March 26, 1935.　　A. P. BUQUOR　　1,995,793
GUN CARRIAGE
Filed July 9, 1932　　9 Sheets-Sheet 2

Fig. 3.

Inventor
Adolph P. Buquor
By Bacon & Thomas
Attorneys

March 26, 1935.  A. P. BUQUOR  1,995,793
GUN CARRIAGE
Filed July 9, 1932  9 Sheets-Sheet 3

Fig. 4.

Inventor
Adolph P. Buquor
By Bacon & Thomas
Attorneys

March 26, 1935.  A. P. BUQUOR  1,995,793
GUN CARRIAGE
Filed July 9, 1932  9 Sheets-Sheet 4

Inventor
Adolph P. Buquor
By Bacon Thomas
Attorneys

March 26, 1935.　　A. P. BUQUOR　　1,995,793
GUN CARRIAGE
Filed July 9, 1932　　9 Sheets-Sheet 7

Inventor
Adolph P. Buquor
By Bacon & Thomas
Attorneys

March 26, 1935.  A. P. BUQUOR  1,995,793
GUN CARRIAGE
Filed July 9, 1932    9 Sheets—Sheet 9

Inventor
Adolph P. Buquor
By Bacon & Thomas
Attorneys

Patented Mar. 26, 1935

1,995,793

UNITED STATES PATENT OFFICE 1,995,793

GUN CARRIAGE

Adolph P. Buquor, York, Pa., assignor to Martin-Parry Corporation, York, Pa., a corporation of Delaware Application July 9, 1932, Serial No. 621,726

21 Claims. (Cl. 89—40)

This invention relates to gun carriages adapted for high speed and easy wheeling.

At the present time the Government of the United States has in its possession some thousands of slow-moving horse-drawn guns of the type generally known as the French 75 mm. While these guns are satisfactory in operation, they have no practical utility for modern warfare for many reasons, including, for instance, the fact that the artillery wheels thereon render them incapable of a speed of more than twelve miles per hour. For practical purposes, therefore, these guns must be transported on motor vehicles and removed therefrom at the place of combat, which is awkward and tedious, involving considerable man-power.

One of the objects of the present invention is to convert this type of gun into an easy-wheeling, high-speed, four-wheel job which has a speed of between thirty-five and fifty miles per hour.

More specifically, the invention comprehends the provision of substantially S-shaped rocker arms adapted for quick attachment to the stationary axles of gun carriages, each rocker arm being provided with stub axles for the interchangeable reception of rubber tired wheels without in any way interfering with the gun equipment possessed by the guns of the type referred to, which permits, among other things:

A. Firing directly from the rubber tired wheels without lifting the carriage from the ground.

B. Permits the guns to be towed at a high rate of speed by a car or truck.

C. Easier wheeling.

D. Less motive or man-power for moving the guns.

E. Firing directly from the tires without preparation or leveling of the ground because of the independent rocking action permitted by the adapter, and which causes wheels to remain in contact with the roadway irrespective of its roughness.

F. Retaining of the position of the gun carriage on the ground whereby practically to eliminate resighting each time the gun is fired.

Another object of the invention is to provide a hinged hub arrangement permitting the gun, hub and axle to raise or lower without lifting the four wheels from the ground, and the provision of hydraulic cushioning means in connection with the hinged hub.

Still another object of the invention is to provide an arrangement of chains and springs for association with the rocker arms to cushion the extreme movements thereof and to prevent the same from turning entirely around in either direction.

From a still more specific aspect, the invention provides rocker devices with the rear arms of shorter length than the front arms so that the lifting action, when fired at center hub, will lift the short end of the rocker if there is any lifting action whatsoever, while causing the forward, longer end with the wheels attached thereto to remain on the ground, thereby causing the gun to stay in the same position.

There are a multiplicity of other important features of this invention which will be apparent to those skilled in the art from a reading of the following specifications, in conjunction with the drawings attached hereto and forming a part hereof, in which:

Figure 12 is a front view taken on line 12—12 of Figure 11; while

Figure 4:
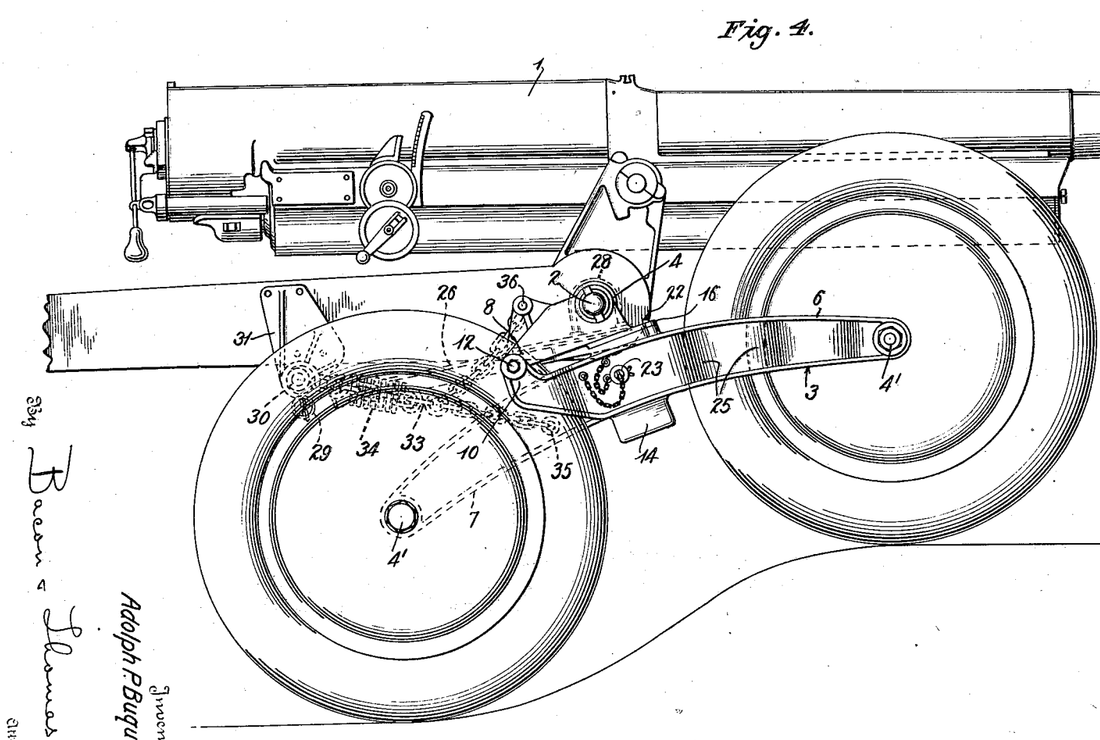
Figure 4 is a side view showing the manner in which the rocker arm permits the assembly to traverse uneven roads without substantially changing the position of the gun.

Referring now in detail to the drawings where like reference characters indicate similar parts, 1 represents a gun which, for example, may be a 75 mm. gun having a stationary fixed gun axle 2 to which, as stated, artillery wheels are ordinarily attached, one on either side. After these wheels are removed, my adapter is applied thereto, which adapter includes what I term S-shaped rocker arms 3, one on either side of the axle. These rocker arms are provided with hubs 4 more specifically disclosed in Figure 9 which are slipped over the ends of the axle and secured thereto. Stub axles 4', extending in reverse directions, are provided by the rocker arms and receive interchangeable standard wheels and bearings, for instance, of the type employed on Ford trucks. The rocker arms constitute stabilizers for permitting one wheel to rise higher than the other while not substantially raising the gun, as shown in Figure 4.

They also provide a complete motorized unit which secures the advantages stated in the objects of the specification, as well as the following advantages. The lateral sliding movement of the gun barrel and the shield 5 is not interfered with in any way. It eliminates the use of springs which are affected by road or firing shocks. No leveling of the gun is necessary when firing the same because of the different positions the independent axles assume relative to each other. It is unnecessary to install segments under the wheels when firing and the firing can be done directly from the tires. This S-shaped rocker construction further balances strains and load at the center hub, requires less man-power and less pulling over rough roads, substitutes straight pulling for lifting; the independent axles allow the wheels to roll over road obstructions, ditches, or uneven ground with just one-half of the lifting required on a two-wheel carrier.

The forward end 6 of the rocker unit is preferably of greater length than the rear portion 7, so that there will be a tendency to lift the rear short end of the rocker, if there is any lifting action at all, permitting the long end to remain on the ground when recoiling.

Figure 1:
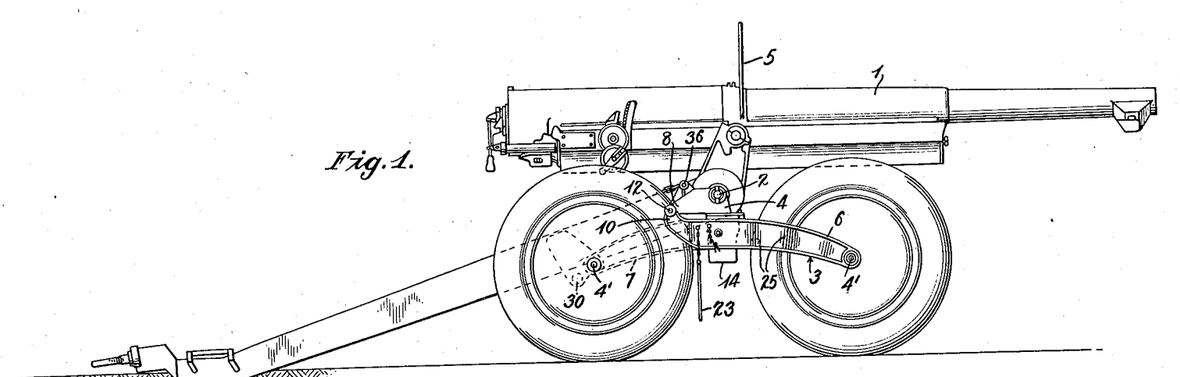
Figure 1 represents a side elevation of the gun in a position ready for firing.
Figure 2:
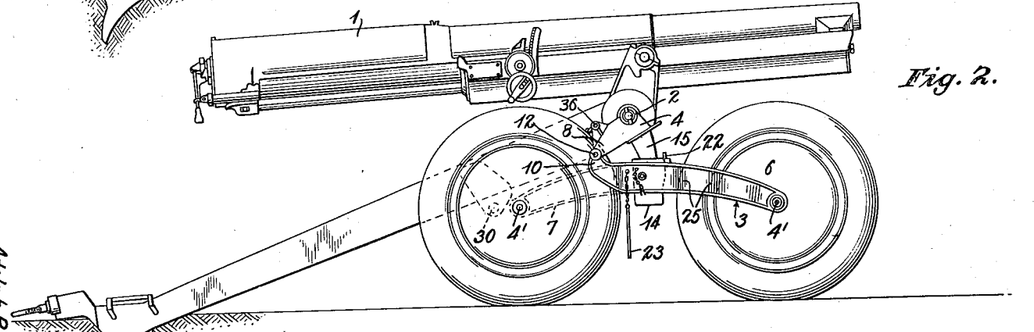
Figure 2 is a similar view showing the gun recoiling, with the hinged hub and gun breech in its raised position.
Figure 3:
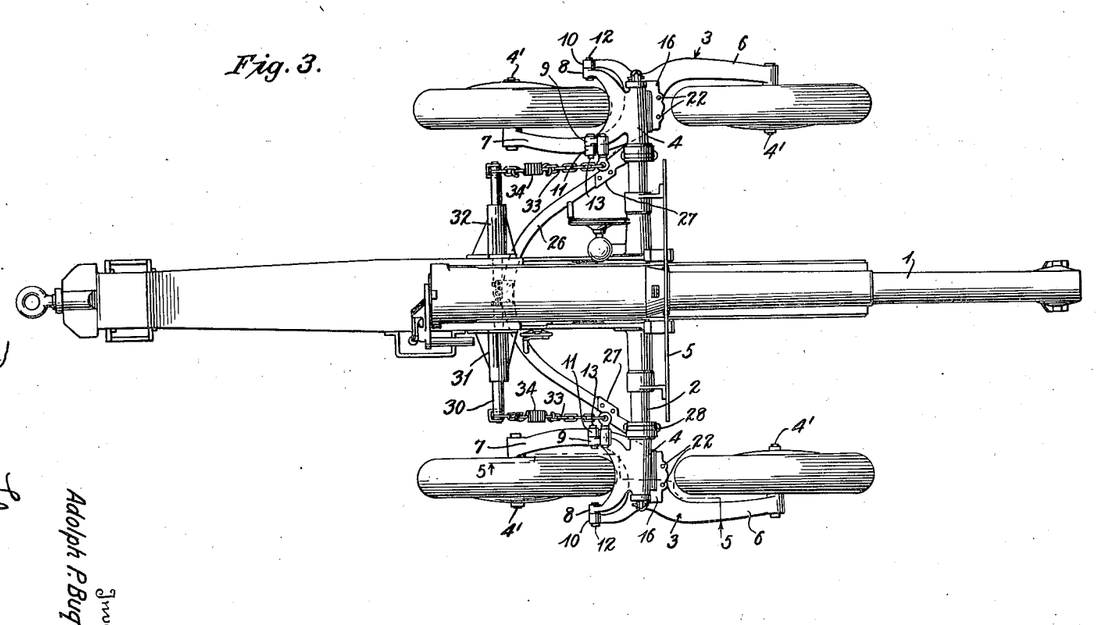
Figure 3 is a top view showing the construction of the S-shaped rocker arm, the hinged hub attached thereto and the coil spring and chain control.
Figure 5:
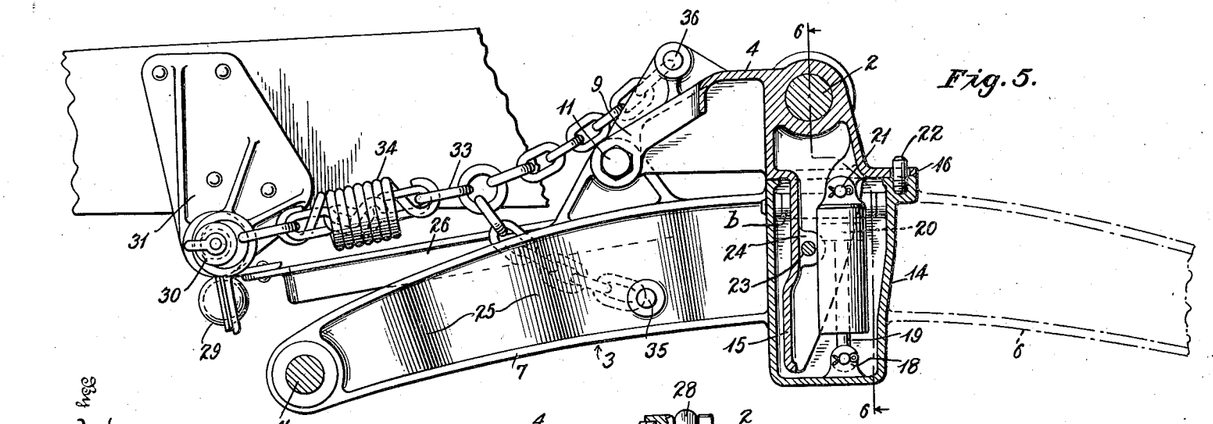
Figure 5 is a detail view taken on line 5—5 of Figure 3 and showing the construction of the guide for the hinged hub.
Figure 6:
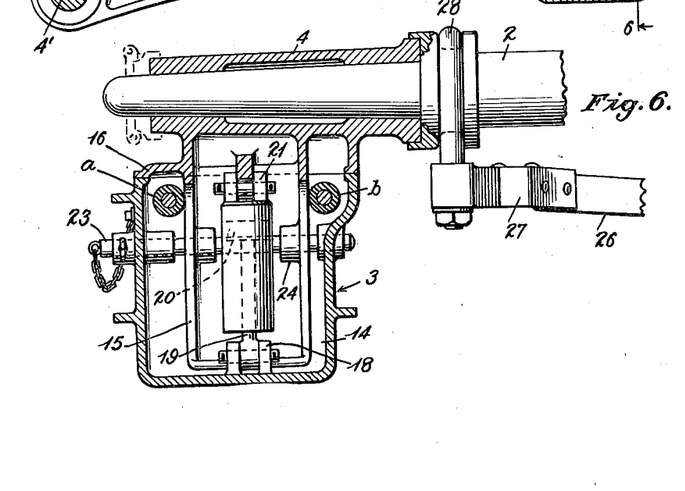
Figure 6 is a detail view taken on line 6—6 of Figure 5.
Figures 8, 9:
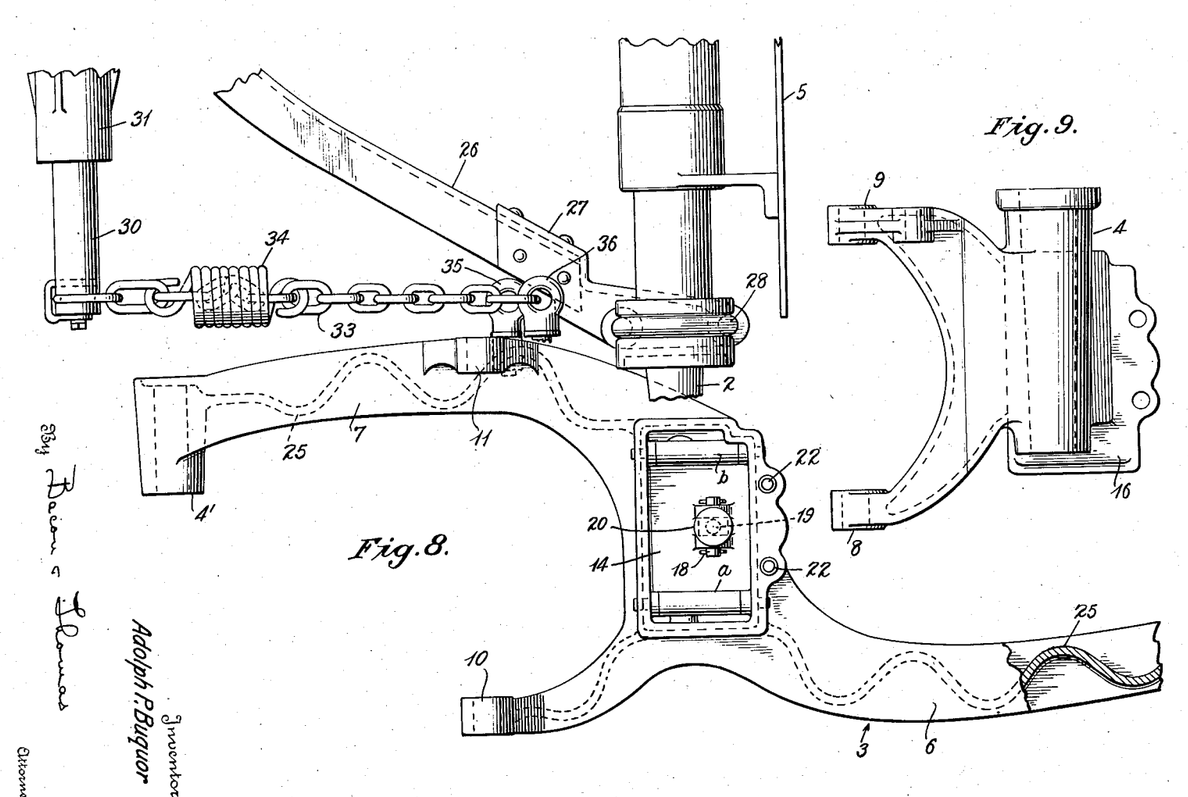
Figure 8 is a top view showing the arrangement of the gun shield and the manner in which the same may be moved laterally without contacting with the rocker arm unit.
Figure 9 is a detail view of the hinge hub per se.

In the construction herein disclosed, I provide means for permitting the axle, hub and gun breech to rise when recoiling without imparting a corresponding movement to the S-shaped rocker arms and the wheels carried thereby. For this purpose the hub 4, as shown in Figure 9, is provided with extensions 8 and 9 hinged to the rocker arm 9 at 10 and 11 by suitable hinge bolts 12 and 13. The rocker arm is preferably of integral formation and is provided with a well 14 adapted to receive a guide extension 15 provided by the hinged hub. The hinged hub is shaped as shown in Figures 5 and 6 having a lid arrangement 16, integral with the downwardly extending guide 15 as shown. In the lower part of the well a hinge 18 is provided for attachment of the rod 19 cooperating with the plunger 20 of a suitable type of hydraulic shock absorber. The cylinder portion of the shock absorber is hinged as at 21 to the lid of the hinged hub. When, therefore, the gun is recoiling as shown in Figure 2, it does so against the frictional resistance caused by the hydraulic shock absorber. This shock absorber may be of any desirable form, but preferably is of the hydraulic type. It is important, however, that it be so adjusted that less frictional resistance is encountered during the upward movement of the axle and gun than during its receding position to normal. This is for the reason that too much frictional resistance would have the tendency of lifting the gun carriage and not permitting the independent hinging of the axle, which is undesirable. Suitable aligning fingers 22 are preferably provided.

When traversing roads, in movement from one position to another, it is usually desirable to lock the hub to the carriage so as to prevent independent movements thereof and for that purpose the invention provides for a locking pin 23 which is slipped through the casting as shown in Figures 5 and 6 and engages the aperture provided by the ears 24 of the hub guide extension 15. The hydraulic shock absorbing means, resisting the arcuate hinging movements of the gun and axle, may be placed in any desirable position, either on the outside of the rocker arm or within the well thereof.

The well provided by the rocker arm is also preferably provided with cushioning rollers $a$ and $b$ which engage the guide extension 15 provided by the hinged hub as shown clearly in Figure 6. This eliminates considerable noise and insures the guide extension receding in an accurate manner to its normal position.

The S-shaped rocker arm is preferably corrugated as at 25 and, as stated, the rearward portion, from the hub backwards, is shorter than the forward portion. In operation this rocker arm balances weight, strains and twist at center and substantially relieves strains from the axle. In order to control the movement of the rocking action and to prevent the S-shaped rocker arm from turning over or under completely, I provide chain and spring arrangements which resiliently cushion the extreme positions of the rockers and prevent the same from turning completely around in either direction of movement.

Figure 7:
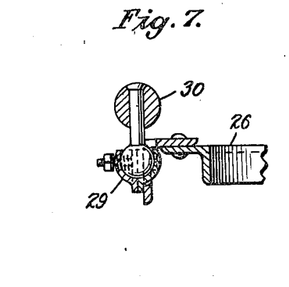
Figure 7 is a detail view of the ball and socket connection for connecting the wishbone to the chain control shaft.

It is important, however, that these means are so constructed that they do not interfere with the free lateral movements of the trail and gun. Therefore, I have provided a construction including a wishbone device 26 secured at either end by a bracket 27 which in turn is fastened to the axle in any desired manner as at 28. The central part of this wishbone has a ball and socket connection 29 as shown in Figure 7. A chain control shaft, held in fixed position relative to the wheels by the wishbone, through the ball and socket connection aforesaid, is designated by reference numeral 30. Sleeves 31 and 32, fitting over the fixed shaft and movable relative thereto, are provided and these are movable laterally in either direction when the gun trail is moved, the same being secured to the trail in any desirable manner. To the extreme ends of the chain control fixed shaft 30 are secured chains 33 having a coil spring 34 and these chains are secured to the rocker arms in any desirable manner as at 35 and 36.

As will be seen, the rocker arms carrying the independently mounted wheels have a complete freedom of movement for normal operations but their extreme positions are cushioned by the coil springs before the chains definitely resist further rotating movement thereof. The entire assemblage of the wishbone, sliding sleeves or brackets 31 and 32, chains, coil springs, etc. are compactly disposed within the minimum space provided thereby in such a way as not to interfere with the free lateral movements of the gun and shield.

The chains are fastened, as explained, to each end of the stationary shaft, which shaft remains in fixed position, permitting the trail and gun to move laterally without moving the chain control shaft or changing the control of the rockers. This also prevents strain or twist going to the gun axle, which has a sliding fit with the feather key or spline, which would bind and shear if allowed to rotate against the key. The shaft holds the chains at one length, thereby not changing the rocker controls when the gun is moved laterally.

Figure 10:
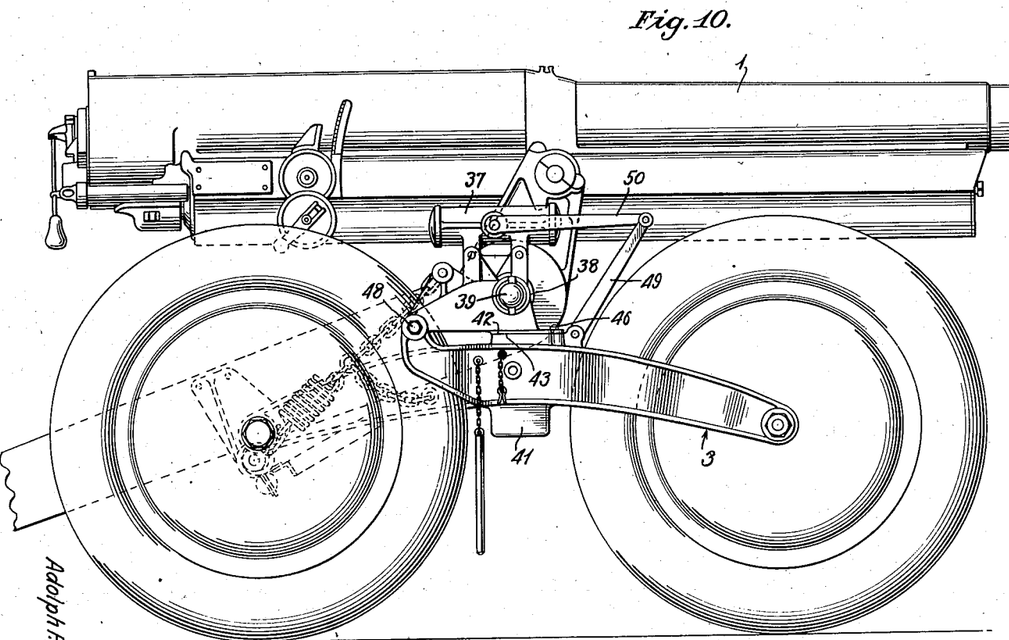
Figure 10 is a side elevation of a modification wherein the hydraulic control means for the hinge hub is located on the outside by a novel linkage arrangement.
Figure 11:
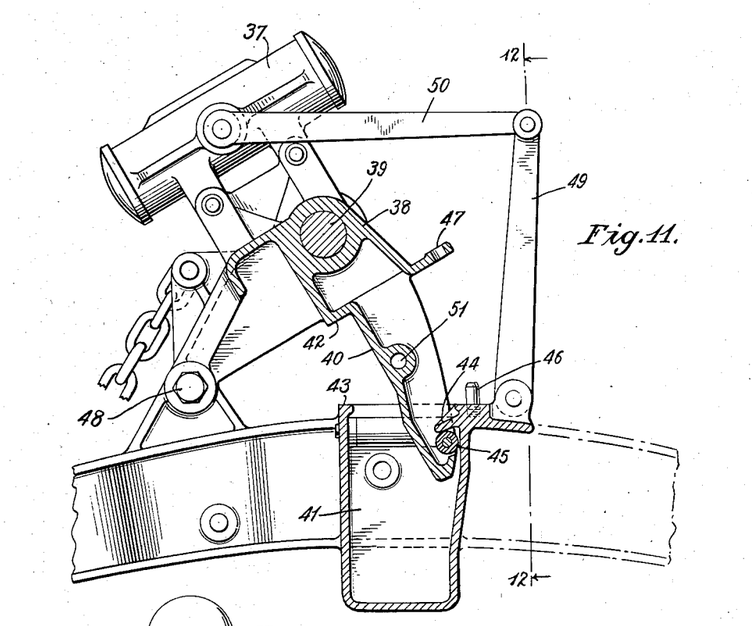
Figure 11 is a detail view thereof showing the hub in raised position after firing.
Figure 12:
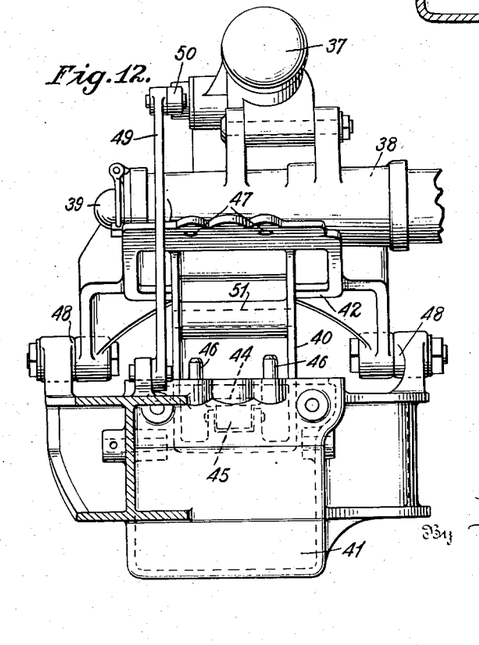
Figure 13:
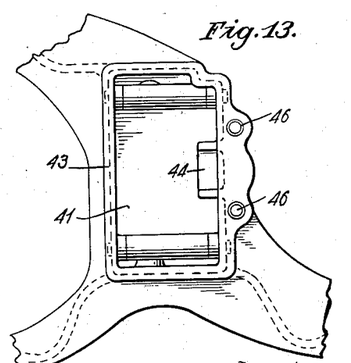
Figure 13 is a top view showing the hollow casting for receiving the guide provided by the hinged hub assembly.

In Figures 10 to 13 inclusive, I have illustrated a variant form of my invention. In this form the rocker arms, of S-shaped configuration, are retained as is the chain and coil spring radius control for the same. However, in this modified form, the hydraulic shock absorbing means for frictionally resisting the hinged movement of the hub and axle is placed on the outside as shown. The hydraulic shock absorber may take any desirable form and is designated, in this modification, by reference numeral 37. The hinged hub 38 fitting over the stationary axle 39 has downwardly extending guiding part 40 which fits within the well 41 provided by the rocker arms. There is provided a shoulder 42 which engages the portion 43 of the well when the device is in its normal operation as shown in Figure 10. The well has a lip 44 engaging the roller 45 carried by the guide extension 40 to prevent the extension from leaving the confines of the well when the gun is recoiling as shown in Figure 11. As a preferred embodiment of the invention, there are registering pins 46 fitting within recesses 47 of the hinged hub. The hub hinges around the pintle 48 and a linkage mechanism 49 and 50 connects the shock absorber and hinged hub to the rocker arms. In this form of the invention it is likewise important that the hydraulic shock absorber be so regulated and constructed that minimum resistance to upward swinging movement is encountered, so that the rocker arms and wheels will not move with the movement of the axle, hub and gun during recoil. A locking pin may also be utilized to lock the hinged hub extension 40 to the well of the rocker arm when moving the gun from one place to another, when it is undesirable to have any relative movement between the axle and the independently mounted wheels. Therefore a locking pin is slipped through the aperture 51 in a manner similar to that described in applicant's preferred embodiment of the invention.

Figure 14:
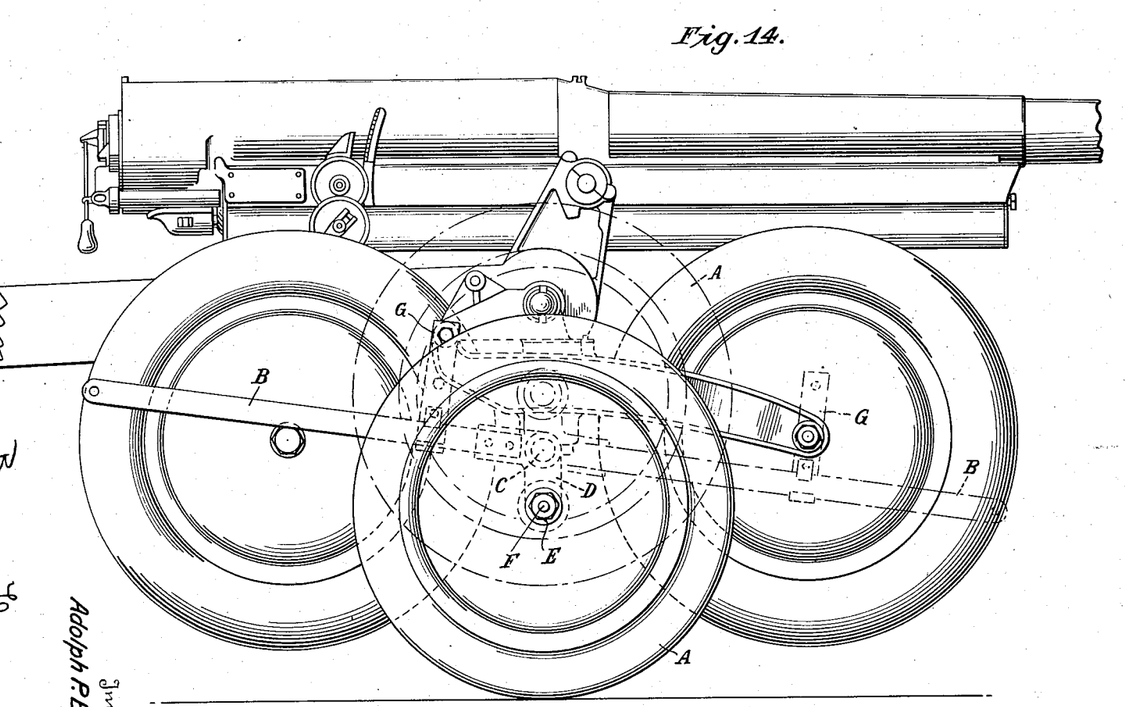
Figures 14, 15 and 16 show modifications.
Figures 15, 16:
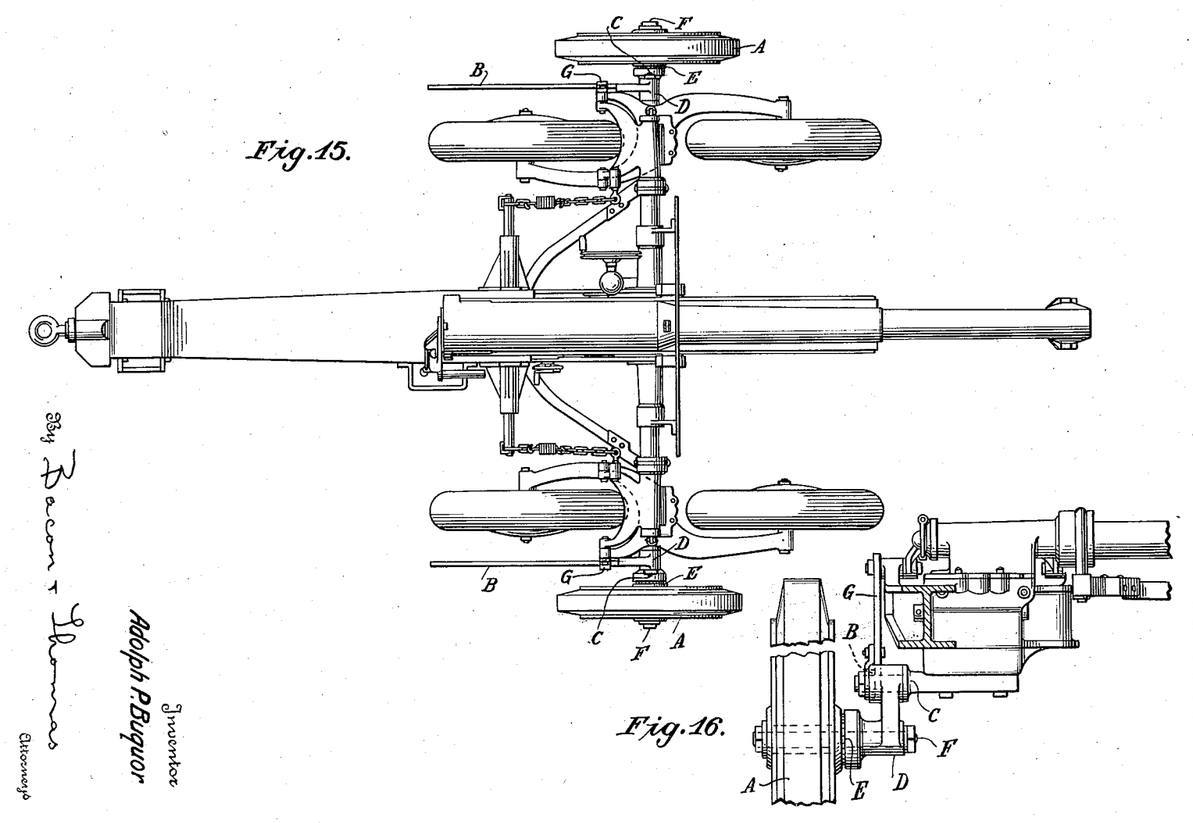

Referring now to Figs. 14, 15 and 16, a still further improvement is disclosed therein. This relates to a pair of pivotally movable wheels A, one mounted on each side of the carriage, as more clearly shown in Fig. 15. These wheels, as will be observed in Fig. 15, extend laterally a greater distance than the gun carriage wheels. Generally the purpose of these wheels is for emergency, and they are mounted at the center of the rockers on each side and are provided with solid rubber or steel tires. When lowered to the position shown in Fig. 14, the carriage may be turned around a complete circle without moving the carriage forwardly or backwardly, and they may also be used for switching the trail to the right or left when firing at a moving target. Furthermore, they permit firing directly from their solid rubber or steel tires and are employed as a jack for lifting the gun for quick changing of the wheels or tires of the gun carriage wheels or for transporting, in emergency cases, as a two-wheel support. They are also useful for lifting the gun quickly out of soft ground.

Referring now more specifically to the drawings, Fig. 14, as stated, discloses the pair of emergency wheels in operative position wherein the gun carriage wheels secured to the rockers are removed to the ground. In order to accomplish this movement, I provide a lever B which may be actuated by any suitable form of linkage. This crank lever is pivoted about a trunnion shaft C which in turn is attached to the bottom of the rocker arm assembly. The rubber or steel tired emergency wheels A are provided with wheel hubs which are attached to the cranks D as at E, stub axles F being provided for that purpose, as clearly shown in Fig. 16. The crank lever B may move about an arc of 180° from the position in full lines in Fig. 14 to the position shown in dotted lines therein for the purpose of lowering the gun carriage upon its four-wheel assembly. This crank lever may be provided with any suitable form of a lock for maintaining it in either one of its extreme movements whereby the emergency wheels are maintained either in fully elevated or fully depressed position. These locks are generally illustrated by reference character G which are clearly shown in Fig. 14.

As will be apparent when the lever B is moved from its dotted line position to its full line position the crank D to which the emergency wheel is journaled in stub axles correspondingly moves so that the axes of the emergency wheels are in the same vertical plane as the trunnion shaft C. In this condition, quick maneuvering can be obtained and, as stated, it has many other important functions for repair work or for transporting, etc.

I am herein claiming all generic subject matter existing between this application and my copending application, Serial No. 621,727, filed simultaneously herewith.

I realize that many changes in construction and arrangement of parts may be made without departing from the spirit of my invention, as defined in the following claims.

I claim:

1. A gun carriage of the character described comprising a stationary axle, a movable gun shield carried by said carriage, rockable units demountably secured to the opposite ends of said axle, said units being of generally S-shaped formation, the forward portions being provided with inwardly extending stub axles receiving demountable wheels for independent rotary movement thereon and having a pocket providing for lateral movement of the gun shield, the rearwardly extending portions of the unit having outwardly extending stub axles for receiving demountable wheels thereon, each of said rocking units being adapted to assume various positions without affecting the rocker unit on the opposite end of said axle.

2. A gun carriage in combination, a stationary axle, rocking units secured to the opposite ends thereof and adapted to freely rock thereon, each of said rockable units having forwardly and rearwardly extending legs provided with independent stub axles, demountable wheels carried by said stub axles and independently rotatable thereon, each of said units being adapted to rock independently of the other, means for controlling the degree of rocking movement of said units, said means comprising a wishbone construction associated with the gun carriage, a transverse fixed shaft, sleeves slidably mounted thereon in accordance with the lateral movements of the gun and shield therefor, and flexible connections secured to said shaft and to said rockable units respectively, adapted to restrain undesirable rocking movement of said units.

3. A gun carriage of the character described comprising an axle, rockable wheel carrying units mounted on each end of said axle for independent movement thereon, each unit having stub axles for receiving interchangeable wheels disposed in the front and at the rear, respectively, of said axle, said units having a hinged hub for receiving said axle whereby the gun, during recoil, together with the axle and hinged hub, may swing relative to said wheels and units without lifting the wheels from the ground.

4. A gun carriage assemblage of the character described comprising rocker arms having stub axles at their forward and rearward ends respectively for receiving rubber tired wheels adapted for independent rotation on said stub axles, means for mounting said rocker arms on the opposite ends of said shaft, said means comprising hubs hingedly secured to said rocker arms and adapted to permit the axle, hub and gun to rise relative to the arms and wheels during recoil.

5. A gun carriage assemblage of the character described comprising rocker arms having stub axles at their forward and rearward ends respectively for receiving rubber tired wheels adapted for independent rotation on said stub axles, means for mounting said rocker arms on the opposite ends of said shaft, said means comprising hubs hingedly secured to said rocker arms and adapted to permit the axle, hub and gun to rise relative to the arms and wheels during recoil, and means for resisting the upward hinging action thereof.

6. A gun carriage assemblage of the character described comprising rocker arms having stub axles at their forward and rearward ends respectively for receiving rubber tired wheels adapted for independent rotation on said stub axles, means for mounting said rocker arms on the opposite ends of said shaft, said means comprising hubs hingedly secured to said rocker arms and adapted to permit the axle, hub and gun to rise relative to the arms and wheels during recoil, and hydraulic means for resisting the upward and downward swinging movements of an axle.

7. An gun carriage of the class described comprising an axle, rocker arms rotatably secured to the ends thereof, each rocker arm having stub axles, rubber tired wheels mounted thereon, and means providing for movement of said axles relatively to the rocker arms and wheels during recoil.

8. A gun carriage of the class described comprising an axle, a rocker unit secured to each end thereof having stub axles, demountable wheels secured thereto, said rocking unit being provided with a hinged hub for securing the same to the axle and for permitting a swinging movement of the hub, axle and gun relative to the rocker arms during recoil.

9. A gun carriage of the class described comprising an axle, hubs secured to the ends thereof, wheels associated with the hubs, said hubs being hinged relatively to the wheels whereby the hubs, axle and gun have a movement relative thereto during recoil.

10. A gun carriage of the class described comprising wheels for transporting the gun, an axle, hubs mounted on said axle, said hubs being hinged relative to the wheels whereby the same, with the axle and gun supported thereby, may have a swinging movement relative to the wheels during recoil.

11. A gun carriage of the class described comprising an axle, rocker units having hinged hubs for securing the same to the axle, each of said rocker units having a plurality of stub axles with wheels interchangeably mounted thereon, said hinged hubs permitting the axle and gun to be moved relatively to the rocker arms during recoil.

12. A gun carriage of the class described comprising an axle, rocker units having hinged hubs for securing the same to the axle, each of said rocker units having a plurality of stub axles with wheels interchangeably mounted thereon, said hinged hubs permitting the axle and gun to be moved relatively to the rocker arms during recoil, and means for yieldably resisting the swinging movements of the hubs.

13. A gun carriage of the class described comprising rocker units and hubs for attachment to the gun axle, each of said units being provided with a plurality of wheels, said hubs being hinged relative to the rocker units whereby the same may move with the axle and gun during recoil and means for preventing said movement during transportation of the gun.

14. A gun carriage of the class described comprising rocker units and hubs for attachment to the gun axle, each of said units being provided with a plurality of wheels, said hubs being hinged relative to the rocker units whereby the same may move with the axle and gun during recoil and means for preventing said movement during transportation of the gun, said means comprising a locking pin for positively fastening the hub to the rocker units.

15. A gun carriage of the character described comprising rocker units, said units having hubs adapted for attachment to the gun axle and each unit carrying a plurality of independently mounted wheels, said rocker units being adapted to move relatively to said axle and relatively to each other, and means for permitting movement of the hubs relative to the rocker units during recoil, whereby to prevent movement of said wheels from the ground.

16. A gun carriage of the character described comprising rocker units, said units having hubs adapted for attachment to the gun axle and each unit carrying a plurality of independently mounted wheels, said rocker units being adapted to move relatively to said axle and relatively to each other, means for permitting movement of the hubs relative to the rocker units during recoil, whereby to prevent movement of said wheels from the ground, and hydraulic means for resisting the relative movements of said hubs.

17. A gun carriage of the class described comprising rocker devices of unitary character, each unit having a plurality of stub axles, wheels mounted thereon for independent rotation, a hub hingedly secured to the rocker devices intermediate their lengths to permit the hubs to move with the axle and gun during recoil, a well provided by the rocker units and a hydraulic shock absorber hinged within the well and to the hub respectively for resisting the swinging movements of the hub in both directions.

18. A gun carriage of the class described comprising rocker devices of unitary character, each unit having a plurality of stub axles, wheels mounted thereon for independent rotation, a hub hingedly secured to the rocker devices intermediate their lengths to permit the hubs to move with the axle and gun during recoil, a well provided by the rocker units and a hydraulic shock absorber hinged within the well and to the hub respectively for resisting the swinging movements of the hub in both directions, and a guide associated with the hinged hub, adapted to fit within the confines of the well when in normal position.

19. A gun carriage of the character described comprising a rocker arm assembly, means for securing a plurality of wheels thereto, a second set of wheels carried by said rocker arm and leverage means for lowering said second set of wheels and for raising the gun carriage wheels from the ground.

20. In combination, a gun carriage, a stationary axle therefor, a rocker arm provided by each of the ends of said stationary axle, and a pair of wheels provided by each of the rocker arms, a pair of emergency wheels pivotally secured to the rocker arms intermediate of the forward and rearward wheels carried thereby, and leverage means for moving the emergency wheels downwardly into contact with the ground when desired and for elevating the gun carriage wheels from the ground.

21. In combination, a gun carriage, a stationary axle therefor, a rocker arm provided by each end of the stationary axle, a pair of wheels rotatably journaled to the forwardly and rearwardly disposed portions of each of the rocker arms for transporting the gun carriage, a pair of intermediately disposed supplemental wheels carried by said rocker arm, and means for moving said supplemental wheels into contact with the ground and for elevating the gun carriage wheels when desired.

ADOLPH P. BUQUOR.